United States Patent
Yang

(10) Patent No.: US 9,354,667 B2
(45) Date of Patent: May 31, 2016

(54) SUPPORTING MECHANISM AND ELECTRONIC DEVICE THEREWITH

(71) Applicant: Wistron Corporation, New Taipei (TW)

(72) Inventor: Ching-Pin Yang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 372 days.

(21) Appl. No.: 13/949,187

(22) Filed: Jul. 23, 2013

(65) Prior Publication Data

US 2014/0376168 A1 Dec. 25, 2014

(30) Foreign Application Priority Data

Jun. 19, 2013 (TW) .............................. 102211435 U

(51) Int. Cl.
*G06F 1/16* (2006.01)

(52) U.S. Cl.
CPC ............. *G06F 1/1681* (2013.01); *G06F 1/1616* (2013.01); *G06F 1/1679* (2013.01); *Y10T 403/32073* (2015.01)

(58) Field of Classification Search
None
See application file for complete search history.

(56) References Cited

U.S. PATENT DOCUMENTS

| | | | | | |
|---|---|---|---|---|---|
| 4,589,659 | A | * | 5/1986 | Yokoi ...................... | A63F 13/08 345/7 |
| 4,759,099 | A | * | 7/1988 | Morano .................. | E05F 1/105 16/49 |
| 5,103,376 | A | * | 4/1992 | Blonder ................. | G06F 1/1616 16/229 |
| 5,337,212 | A | * | 8/1994 | Bartlett .................... | G06F 1/162 248/920 |
| 5,494,447 | A | * | 2/1996 | Zaidan ................... | G06F 1/1618 16/361 |
| 5,548,478 | A | * | 8/1996 | Kumar .................... | G06F 1/162 16/223 |
| 6,532,147 | B1 | * | 3/2003 | Christ, Jr. .............. | G06F 1/1615 248/917 |
| 7,065,835 | B2 | * | 6/2006 | Kuramochi ........... | G06F 1/1616 16/348 |
| 7,158,634 | B2 | * | 1/2007 | Eromaki ............... | G06F 1/1615 345/168 |
| 7,599,181 | B2 | * | 10/2009 | Chuang .................. | H04M 1/022 361/679.02 |
| 7,974,084 | B2 | * | 7/2011 | Chen ..................... | G06F 1/1616 361/679.21 |
| 8,050,030 | B2 | * | 11/2011 | Wu ....................... | G06F 1/1616 248/917 |
| 8,089,750 | B2 | * | 1/2012 | Chen ..................... | G06F 1/1616 248/278.1 |
| 8,108,970 | B2 | * | 2/2012 | Huang ..................... | E05D 3/18 16/337 |
| 8,713,758 | B2 | * | 5/2014 | Mitsui ................... | G06F 1/1615 16/357 |
| 8,843,183 | B2 | * | 9/2014 | Griffin .................. | G06F 1/1616 455/575.1 |
| 8,902,572 | B2 | * | 12/2014 | Yu ......................... | G06F 1/1624 361/679.06 |
| 8,971,033 | B2 | * | 3/2015 | Lee ........................ | 361/679.27 |
| 2006/0139862 | A1 | * | 6/2006 | Wang ..................... | G06F 1/1616 361/679.3 |
| 2006/0256512 | A1 | * | 11/2006 | Esther Kang ........... | G06F 1/162 361/679.05 |
| 2007/0183123 | A1 | * | 8/2007 | Chuan et al. .................. | 361/679 |
| 2011/0023272 | A1 | * | 2/2011 | Huang ..................... | E05D 3/18 16/362 |

* cited by examiner

*Primary Examiner* — Courtney Smith
*Assistant Examiner* — Rashen E Morrison
(74) *Attorney, Agent, or Firm* — Winston Hsu; Scott Margo

(57) ABSTRACT

A supporting mechanism for supporting a first module on a second module is disclosed. The first module is pivoted to the second module via a hinge assembly. The supporting mechanism includes a first member and a second member. The first member includes a sliding end slidably installed on the first module. The second member is connected to the first member in a relatively slidable manner. The second member includes a pivoting end pivoted to the second module. When the first module is rotated along an expanding direction with respect to the second module, the sliding end of the first member slides along a first direction toward the hinge assembly such that the first member slides along a second direction further away from the second member.

20 Claims, 6 Drawing Sheets

SUPPORTING MECHANISM AND ELECTRONIC DEVICE THEREWITH

BACKGROUND OF THE INVENTION

1. Field of the Invention

The present invention relates to a supporting mechanism and an electronic device therewith, and more particularly, to a supporting mechanism for fixing two pivoted modules as the two modules are relatively expanded and an electronic device therewith.

2. Description of the Prior Art

Generally speaking, a notebook computer includes a host module and a display module, and the display module is pivoted to the host module via a hinge assembly. Accordingly, the display module is capable of rotating to be expanded on the host module by the hinge assembly for a user to operate. Alternatively, the display module is capable of rotating to be contained on the host module by the hinge assembly for facilitating the user to carry or contain as well. Recently, with development of touch panel industry, a design that combines a touch panel with the display module of the notebook computer has been a trend of the notebook computer. However, the aforesaid design that combines the touch panel with the display module results in increase of weight. When the display module is expanded on the host module, a conventional hinge assembly is incapable of supporting the display module equipped with the touch panel. As a result, it results in wobble issues of the notebook computer when the user touches the touch panel on the display module.

SUMMARY OF THE INVENTION

Thus, the present invention provides a supporting mechanism for fixing two pivoted modules as the two modules are relatively expanded and an electronic device therewith for solving above drawbacks.

According to the claimed invention, a supporting mechanism for supporting a first module on a second module is disclosed. The first module is pivoted to the second module via a hinge assembly, and the supporting mechanism includes a first member and a second member. The first member includes a sliding end slidably installed on the first module. The second member is connected to the first member in a relatively slidable manner, and the second member includes a pivoting end pivoted to the second module. The sliding end of the first member slides on the first module along a first direction toward the hinge assembly when the first module is rotated along an expanding direction with respect to the second module, such that the first member slides with respect to the second member along a second direction far away from the second member, and wherein a friction force is generated between the first member and the second member when the first member slides along the second direction with respect to the second member.

According to the claimed invention, the sliding end of the first member is slidably installed in a sliding slot on the first module, and the sliding end of the first member slides along the first direction to abut against a first end of the sliding slot when the first module is rotated along the expanding direction with respect to the second module, such that the first end of the sliding slot pulls the first member to slide along the second direction with respect to the second member.

According to the claimed invention, the sliding end of the first member slides along a third direction far away from the hinge assembly to abut against a second end of the sliding slot when the first module is rotated along a containing direction opposite to the expanding direction with respect to the second module, such that the second end pushes the first member to slide along a fourth direction toward the second member with respect to the second member.

According to the claimed invention, the first member further includes a first stopping end, and the second member further includes a second stopping end. The supporting mechanism further includes a first stopping structure and a second stopping structure. The first stopping structure is arranged on the first stopping end of the first member. The second stopping structure is arranged on the second stopping end of the second member, and the first member slides along the second direction to a stopping position with respect to the second member when the first module is rotated along the expanding direction to an expanding position with respect to the second module, such that the second stopping structure stops the first stopping structure.

According to the claimed invention, the supporting mechanism further includes a slidable engaging mechanism connected to the sliding end of the first member, such that the sliding end of the first member is slidably disposed in a sliding slot on the first module.

According to the claimed invention, the slidable engaging mechanism includes a sliding base and a sliding member. The sliding base is connected to the sliding end of the first member. The sliding member is slidably disposed within the sliding slot on the first module. The sliding member includes a connecting portion and an engaging portion connected to the connecting portion. The connecting portion connects the sliding base, and the engaging portion engages with lateral walls of the sliding slot.

According to the claimed invention, the sliding base and the sliding end of the first member are integrally formed, and the sliding member is a screw. The connecting portion of the sliding member is a thread portion of the screw, and the engaging portion of the sliding member is a nut of the screw.

According to the claimed invention, the supporting mechanism further includes a pivotal engaging mechanism connected to the pivoting end of the second member, such that the pivoting end of the second member is pivoted to a pivoting hole on the second module.

According to the claimed invention, the pivotal engaging mechanism includes a pivotal base and a pivotal member. The pivotal base is connected to the pivoting end of the second member. The pivotal member is pivoted to the pivoting hole on the second module, and the pivotal member includes a bridging portion and a wedging portion connected to the bridging portion. The bridging portion bridges the pivotal base, and the wedging portion wedges lateral walls of the pivoting hole.

According to the claimed invention, the pivotal base and the pivoting end of the second member are integrally formed, and the pivotal member is a screw. The bridging portion of the pivotal member is a thread portion of the screw, and the wedging portion of the pivotal member is a nut of the screw.

According to the claimed invention, one of the first member and the second member is a shaft, the other one of the first member and the second member is a sleeve, and the sleeve slidably sheathes the shaft.

According to the claimed invention, an electronic device includes a first module, a second module and a supporting mechanism. The hinge assembly is for pivoting the first module and the second module, and the supporting mechanism is for supporting the first module on the second module. The supporting mechanism includes a first member and a second member. The first member includes a sliding end slidably installed on the first module. The second member is connected to the first member in a relatively slidable manner. The second member includes a pivoting end pivoted to the second module. The sliding end of the first member slides on the first module along a first direction toward the hinge assembly when the first module is rotated along an expanding direction with respect to the second module, such that the first member slides with respect to the second member along a second direction far away from the second member, and wherein a friction force is generated between the first member and the second member when the first member slides along the second direction with respect to the second member, so as to fix the first module on the second module.

According to the claimed invention, one of the first member and the second member is a shaft, and the other one of the first member and the second member is a sleeve. The sleeve slidably sheathes the shaft. The first module is one of a display module and a host module, and the second module is the other one of the display module and the host module.

In summary, the first member and the second member of the supporting mechanism of the present invention are respectively connected to the first module and the second module, and the second member is connected to the first member in a relatively slidable manner. When the first module and the second module of the electronic device are relatively rotated to be expanded via the hinge assembly, the first member and the second member can rotate with the first module and the second module, such that the first member slides with respect to the second member. During the first member slides with respect to the second member, the friction force is generated between the first member and the second member for supporting and fixing the first module and the second module. As a result, when the first module of the electronic device is equipped with an extra module, such as a touch panel, it can not only be supported by the hinge assembly but also by the friction force generated by the first member and the second member, so as to support and fix the first module equipped with the extra module on the second module. In such a manner, it solves the wobble issues of the first module equipped with the extra module in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
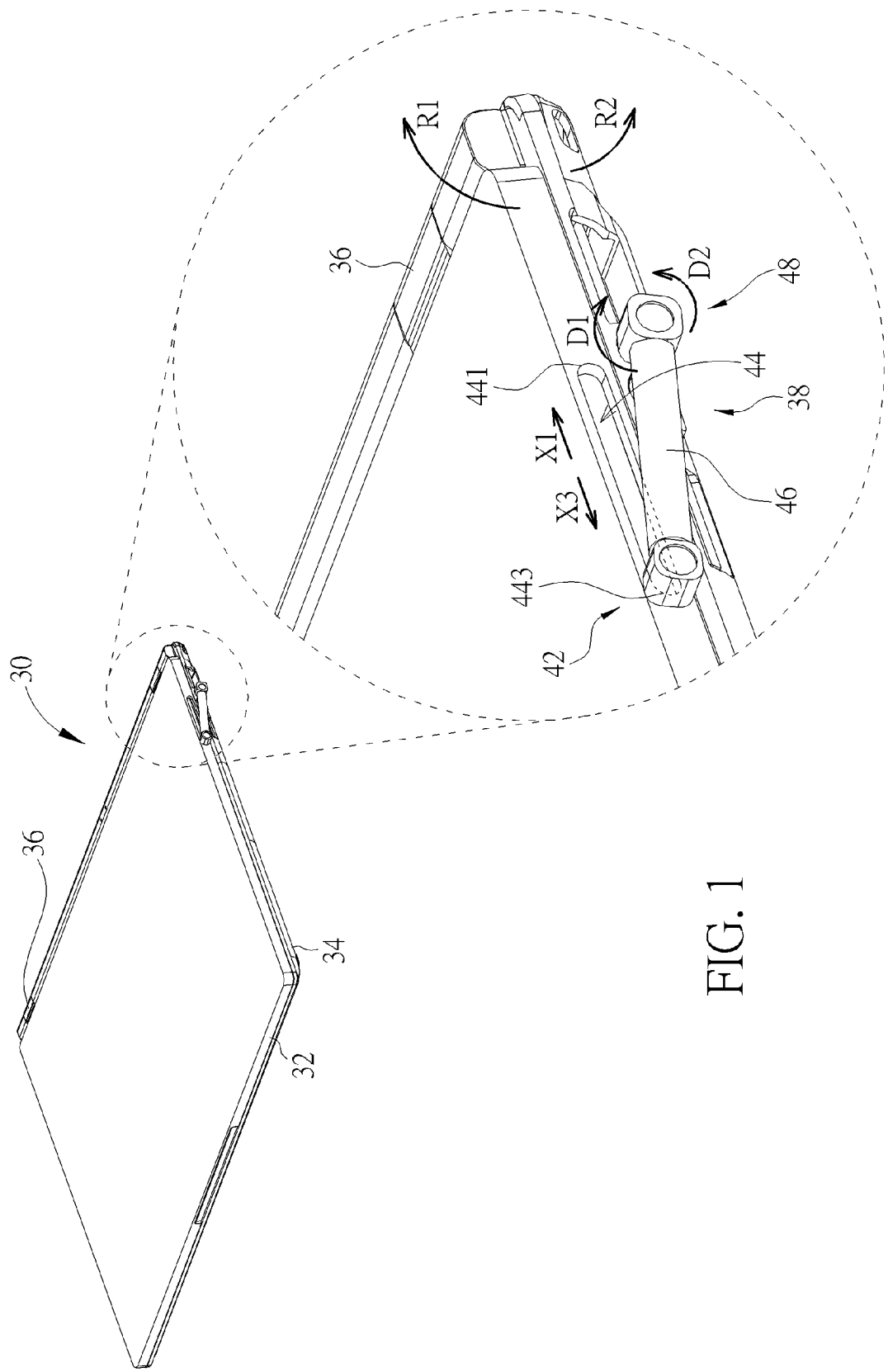
FIG. 1 is a diagram of an electronic device in a contained status according to an embodiment of the present invention.
Figure 2:
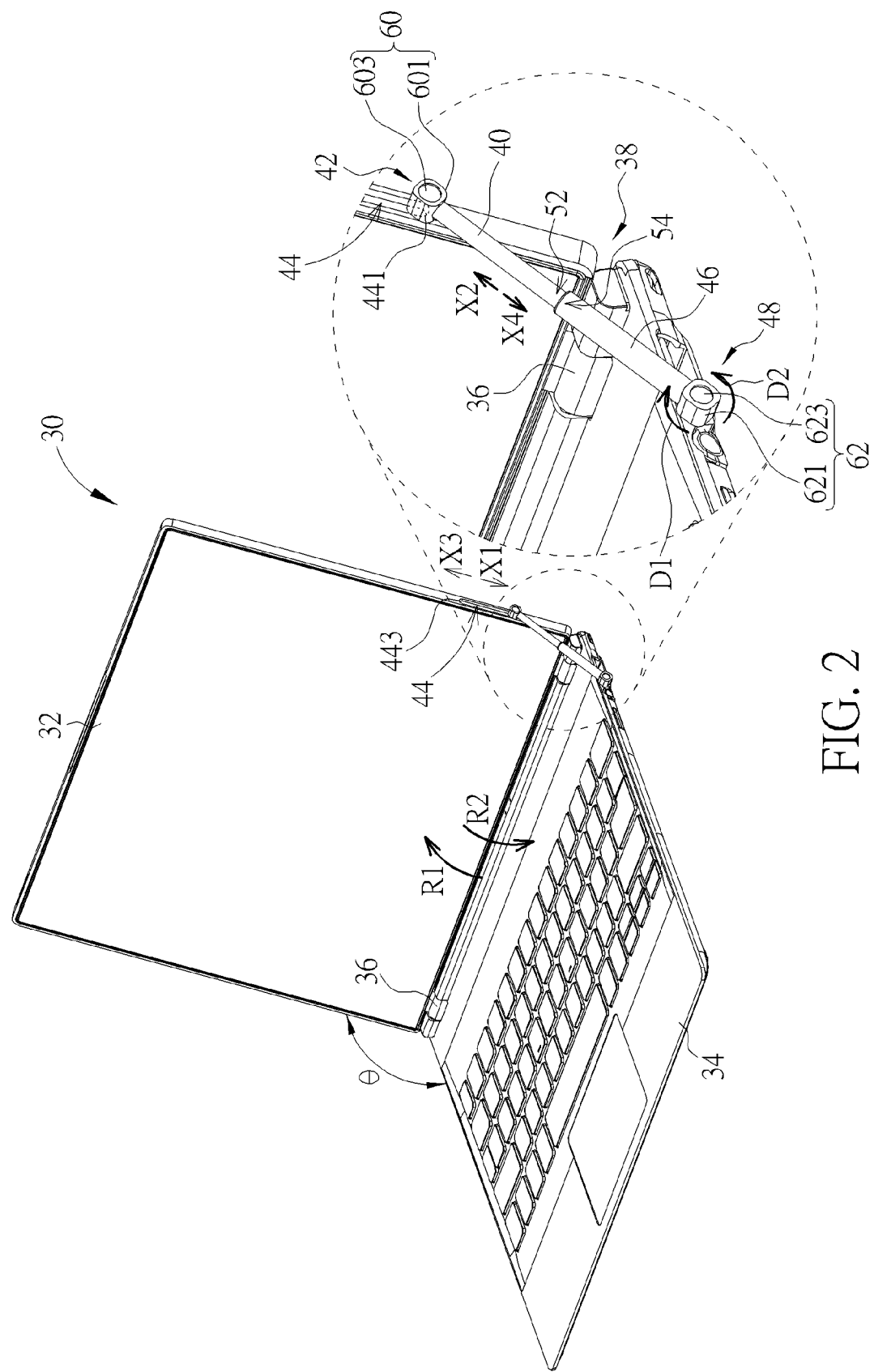
FIG. 2 is a diagram of the electronic device in an expanded status according to the embodiment of the present invention.

Please refer to FIG. 1 and FIG. 2. FIG. 1 is a diagram of an electronic device 30 in a contained status according to an embodiment of the present invention. FIG. 2 is a diagram of the electronic device 30 in an expanded status according to the embodiment of the present invention. As shown in FIG. 1 and FIG. 2, the electronic device 30 includes a first module 32, a second module 34 and a hinge assembly 36. The hinge assembly 36 is for pivoting the first module 32 and the second module 34, such that the first module 32 is pivoted to the second module 34 via the hinge assembly 36. Accordingly, the first module 32 can be rotated along an expanding direction R1 with respect to the second module 34 and expanded on the second module 34, as shown in FIG. 2, for a user to operate the electronic device 30. Alternatively, the first module 32 can be rotated along a containing direction R2 opposite to the expanding direction R1 with respect to the second module 34 and contained on the second module 34, as shown in FIG. 1, for facilitating the user to contain or carry the electronic device 30.

Figure 3:
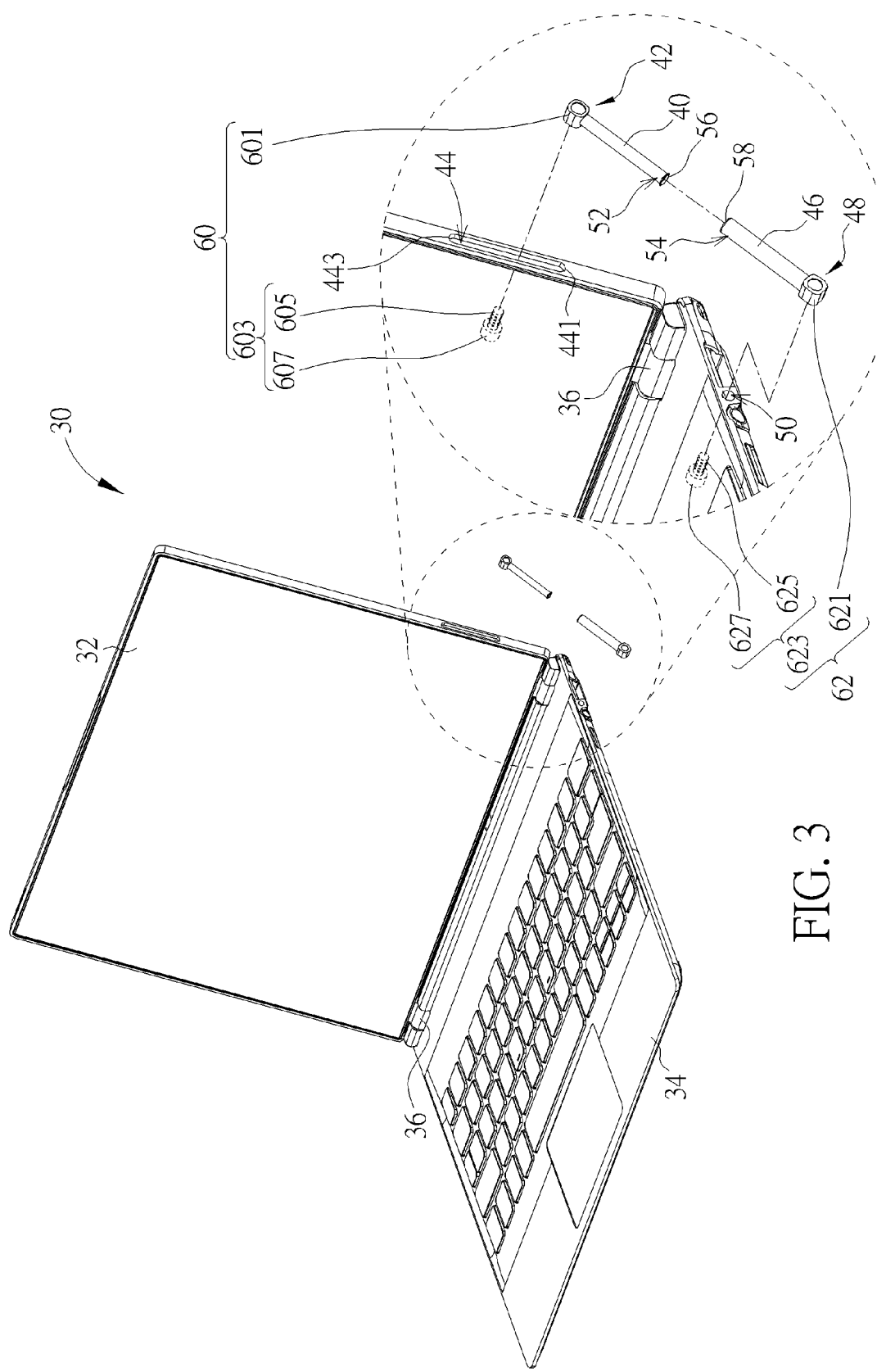
FIG. 3 is an exploded diagram of the electronic device in the expanded status according to the embodiment of the present invention.

In addition, the electronic device 30 further includes a supporting mechanism 38. When the first module 32 is rotated along the containing direction R2 to be expanded on the second module 34, the supporting mechanism 38 is used for supporting the first module 32 on the second module 34. Furthermore, the supporting mechanism 38 includes a first member 40, and the first member 40 includes a sliding end 42. A sliding slot 44 is formed on the first module 32, and the sliding end 42 of the first member 40 is slidably installed in the sliding slot 44 on the first module 32. Accordingly, the sliding end 42 can be installed on the first module 32 in a slidable manner. Please refer to FIG. 2 and FIG. 3. FIG. 3 is an exploded diagram of the electronic device 30 in the expanded status according to the embodiment of the present invention. As shown in FIG. 2 and FIG. 3, the supporting mechanism 38 further includes a second member 46 connected to the first member 40 in a relatively slidable manner. The second member 46 includes a pivoting end 48, and a pivoting hole 50 is formed on the second module 34. The pivoting end 48 of the second member 46 is slidably installed in the pivoting hole 50 on the second module 34. Accordingly, the pivoting end 48 can be pivoted to the second module 34 in a rotable manner.

In addition, the first member 40 further includes a first stopping end 52, and the second member 46 further includes a second stopping end 54. The supporting mechanism 38 further includes a first stopping structure 56 and a second stopping structure 58. The first stopping structure 56 is arranged on the first stopping end 52 of the first member 40, and the second stopping structure 58 is arranged on the second stopping end 54 of the second member 46. In this embodiment, the first stopping structure 56 is an annular rib structure protruding outwardly from the first stopping end 52 of the first member 40, and the annular rib structure (i.e. the first stopping structure 56) and the first stopping end 52 are integrally formed. The second stopping structure 58 is also an annular rib structure protruding inwardly from the second stopping end 54 of the second member 46, and the annular rib structure (i.e. the second stopping structure 58) and the second stopping end 54 are integrally formed. Structures of the first stopping structure 56 and the second stopping structure 58 are not limited to those mentioned in this embodiment. For example, the first stopping structure 56 can be a hook as well, and the second stopping structure 58 can be an engaging slot as well. As for which one of the above-mentioned designs is adopted, it depends on practical demands.

In addition, the supporting mechanism 38 further includes a slidable engaging mechanism 60 connected to the sliding end 42 of the first member 40. Furthermore, the slidable engaging mechanism 60 includes a sliding base 601 and a sliding member 603. The sliding base 601 is connected to the sliding end 42 of the first member 40, and the sliding member 603 is slidably disposed in the sliding slot 44 on the first member 40. Accordingly, the sliding end 42 of the first member 40 can be slidably disposed in the sliding slot 44 on the first module 32 by utilizing the aforesaid slidable engaging mechanism 60. In this embodiment, the sliding base 601 of the slidable engaging mechanism 60 and the sliding end 42 of the first member 40 are, but not limited to, integrally formed. For example, the sliding base 601 of the slidable engaging mechanism 60 and the sliding end 42 of the first member 40 can be two separate parts as well, and the sliding base 601 can be engaged with or screwed on the sliding end 42. As for which one of the above-mentioned designs is adopted, it depends on practical demands.

In this embodiment, the sliding member 603 includes a connecting portion 605 and an engaging portion 607 connected to the connecting portion 605. During assembly, after the connecting portion 605 of the sliding member 603 passes through the sliding slot 44, the connecting portion 605 of the sliding member 603 is used for connecting the sliding base 601 which is connected to the sliding end 42 of the first member 40. At the meantime, the engaging portion 607 of the sliding member 603 is used for engaging lateral walls of the sliding slot 44. In such a manner, the sliding end 42 of the first member 40 can be slidably installed on the first module 32 by utilizing the slidable engaging mechanism 60. Practically, the sliding member 603 is a screw. The connecting portion 605 of the sliding member 603 is a thread portion of the screw, and the engaging portion 607 of the sliding member 603 is a nut of the screw. Structures of the sliding member 603 are not limited to those mentioned in this embodiment, and it depends on practical demands.

In addition, the supporting mechanism 38 further includes a pivotal engaging mechanism 62 connected to the pivoting end 48 of the second member 46. Furthermore, the pivotal engaging mechanism 62 includes a pivotal base 621 and a pivotal member 623. The pivotal base 621 is connected to the pivoting end 48 of the second member 46, and the pivotal member 623 is pivoted to the pivoting hole 50 on the second module 34. Accordingly, the pivoting end 48 of the second member 46 can be pivoted to the pivoting hole 50 on the second module 34 by the aforesaid pivotal engaging mechanism 62. In this embodiment, the pivotal base 621 of the pivotal engaging mechanism 62 and pivoting end 48 of the second member 46 are, but not limited to, integrally formed. For example, the pivotal base 621 of the pivotal engaging mechanism 62 and the pivoting end 48 of the second member 46 can be two separate parts as well, and the pivotal base 621 can be engaged with or screwed on the pivoting end 48. As for which one of the above-mentioned designs is adopted, it depends on practical demands.

In this embodiment, the pivotal member 623 includes a bridging portion 625 and a wedging portion 627 connected to the bridging portion 625. During assembly, after the bridging portion 625 of the pivotal member 623 passes through the pivoting hole 50, the bridging portion 625 of the pivotal member 623 is used for bridging the pivotal base 621 which is connected to the pivoting end 48 of the second member 46. At the meantime, the wedging portion 627 of the pivotal member 623 is used for wedging lateral walls of the pivoting hole 50. In such a manner, the pivoting end 48 of the second member 46 can be pivoted to the second member 46 by utilizing the pivotal engaging mechanism 62. Practically, the pivotal member 623 is a screw. The bridging portion 625 of the pivotal member 623 is a thread portion of the screw, and the wedging portion 627 of the pivotal member 623 is a nut of the screw. Structures of the pivotal member 623 are not limited to those mentioned in this embodiment, and it depends on practical demands.

Figure 4:
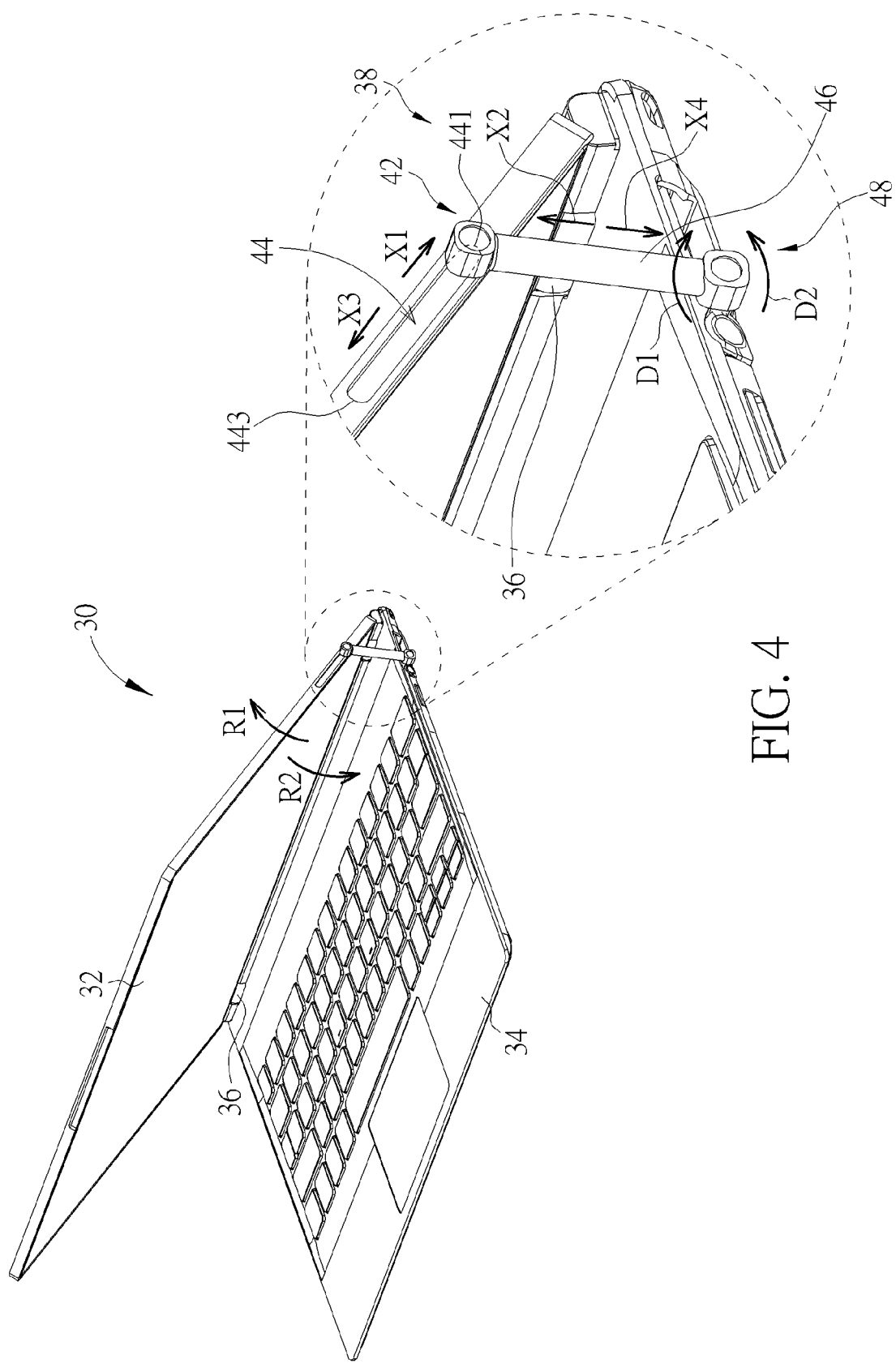
FIG. 4 is a diagram of the electronic device in a first abutting status according to the embodiment of the present invention.
Figure 5:
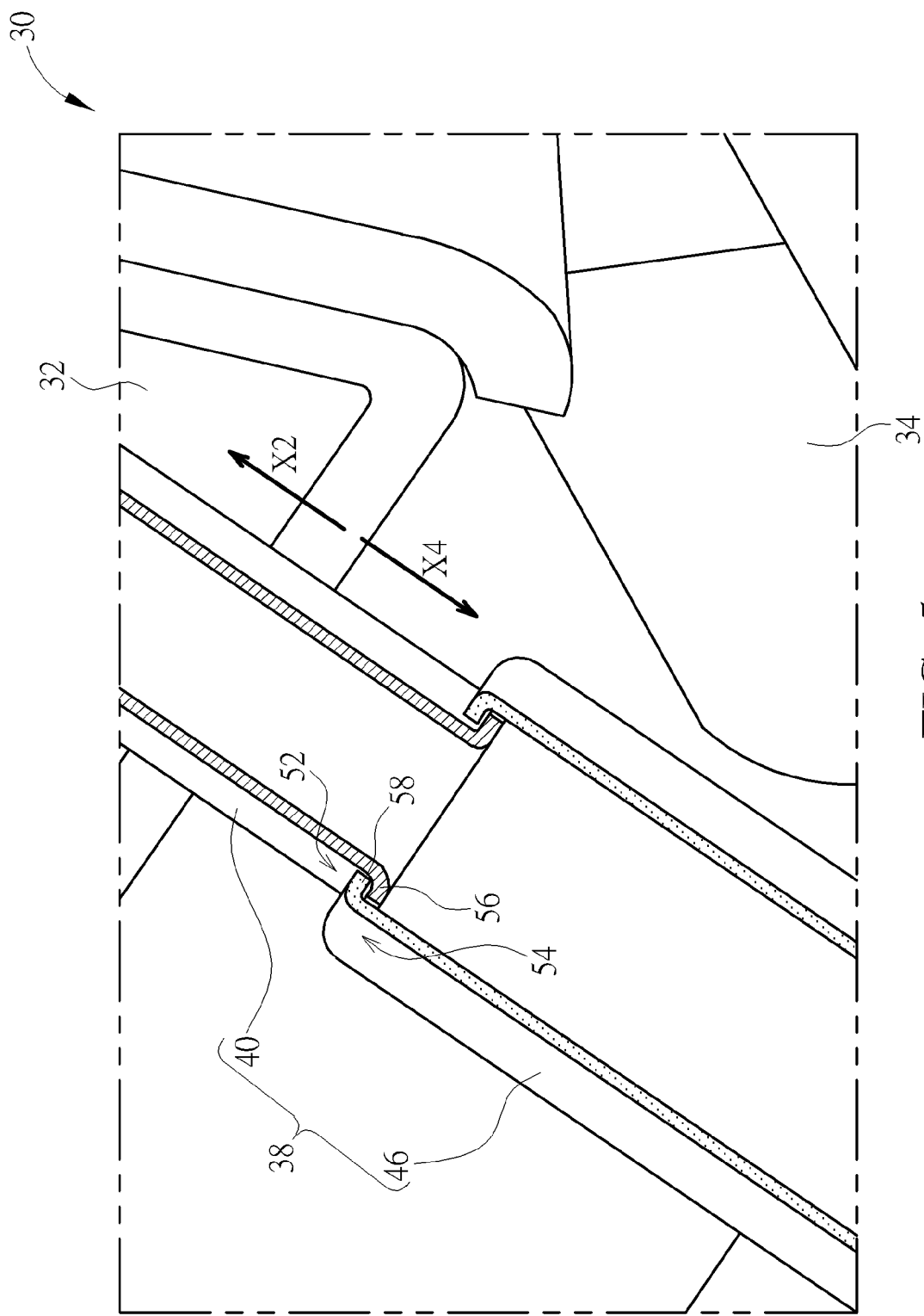
FIG. 5 is a sectional diagram of a supporting mechanism in a stopping status according to the embodiment of the present invention.

Please refer to FIG. 1, FIG. 2, FIG. 4 and FIG. 5. FIG. 4 is a diagram of the electronic device 30 in a first abutting status according to the embodiment of the present invention. FIG. 5 is a sectional diagram of the supporting mechanism 38 in a stopping status according to the embodiment of the present invention. As shown in FIG. 1, FIG. 2, FIG. 4 and FIG. 5, when the electronic device 30 is desired to be operated, the first module 32 is rotated from a containing position shown in FIG. 1 along the expanding direction R1 with respect to the second module 34. At the meanwhile, the pivoting end 48 of the second member 46 rotates in the pivoting hole 50 on the second module 34, and the sliding end 42 of the first member 40 slides within the sliding slot 44 along a first direction X1 toward the hinge assembly 36. By the aforesaid design that the pivoting end 48 rotates in the pivoting hole 50 and the sliding end 42 slides in the sliding slot 44, the first member 40 and the second member 46 of the supporting mechanism 38 is capable of being rotated along a first rotating direction D1 when the first module 32 and the second module 34 are relatively rotated to be expanded, as shown in FIG. 1 and FIG. 4. In this embodiment, the first rotating direction D1 is identical to the expanding direction R1.

Furthermore, when the first module 32 is rotated along the expanding direction R1 to a first abutting position shown in FIG. 4 with respect to the second module 34, the sliding end 42 of the first member 40 slides in the sliding slot 44 along the first direction X1 to abut against a first end 441 of the sliding slot 44. Afterwards, the first module 32 continues to be rotated from the first abutting position shown in FIG. 4 along the expanding direction R1 with respect to the second module 34, the first member 40 and the second member continues to rotate along the first rotating direction D1. Accordingly, the first end 441 of the sliding slot 44 on the first module 32 drives the sliding end 42 of the first member 40, so as to pull the first member 40 to slide along a second direction X2 far away from the second member 46 with respect to the second member 46. In other words, when the first module 32 continues to be rotated from the first abutting position shown in FIG. 4 along the expanding direction R1 with respect to the second module 34, the first member 40 is pulled to stretch from the second member 46 by the first end 441 of the sliding slot 44 on the first module 32.

Furthermore, when the first module 32 is rotated from the first abutting position shown in FIG. 4 to the expanding position shown in FIG. 2 along the expanding direction R1, the first member 40 slides to a stopping position shown in FIG. 5 along the second direction X2 with respect to the second member 46. At the meanwhile, the second stopping structure 58 connected to the second stopping end 54 of the second member 46 stops the first stopping structure 56 connected to the first stopping end 52 of the first member 40. In such a manner, the first module 32 can be fixed in the expanding position shown in FIG. 2 with respect to the second module 34 for the user to operate the electronic device 30. When the first member 40 slides along the second direction X2 with respect to the second member 46, i.e. when the first module 32 is rotated from the first abutting position shown in FIG. 4 to the expanding position shown in FIG. 2 along the expanding direction R1 with respect to the second module 34, a friction force is generated between the first member 40 and the second member 46 in a structural fit manner (e.g. in a tight fit manner), and the friction force is used for fixing the first module 32 and the second module 34 relatively in a position between the first abutting position shown in FIG. 4 and the expanding position shown in FIG. 2 during the process that the first module 32 is rotated with respect to the second module 34. In other words, the first module 32 and the second module 34 can be fixed in the position between the first abutting position and the expanding position by the friction force generated between the first member 40 and the second member 46, so as to increase flexibility of the electronic device 30 in use.

In this embodiment, when the first module 32 and the second module 34 are fixed in the expanding position shown in FIG. 2, an angle θ included between the first module 32 and the second module 34 can be 120 degrees. The angle θ included between the first module 32 and the second module 34 when the electronic device 30 is in the expanding status is not limited to those mentioned in this embodiment. For example, when a length of the first member 40 and a length of the second member 46 increase, the angle θ included between the first module 32 and the second module 34 when the electronic device 30 is in the expanding status is greater than 120 degrees. When the length of the first member 40 and the length of the second member 46 decrease, the angle θ included between the first module 32 and the second module 34 when the electronic device 30 is in the expanding status is smaller than 120 degrees. In other words, the present invention can adjust the angle θ included between the first module 32 and the second module 34 when the electronic device 30 is in the expanding status by changing the length of the first member 40 and the length of the second member 46, so as to enhance flexibility of the electronic device 30 in the expanding status.

Figure 6:
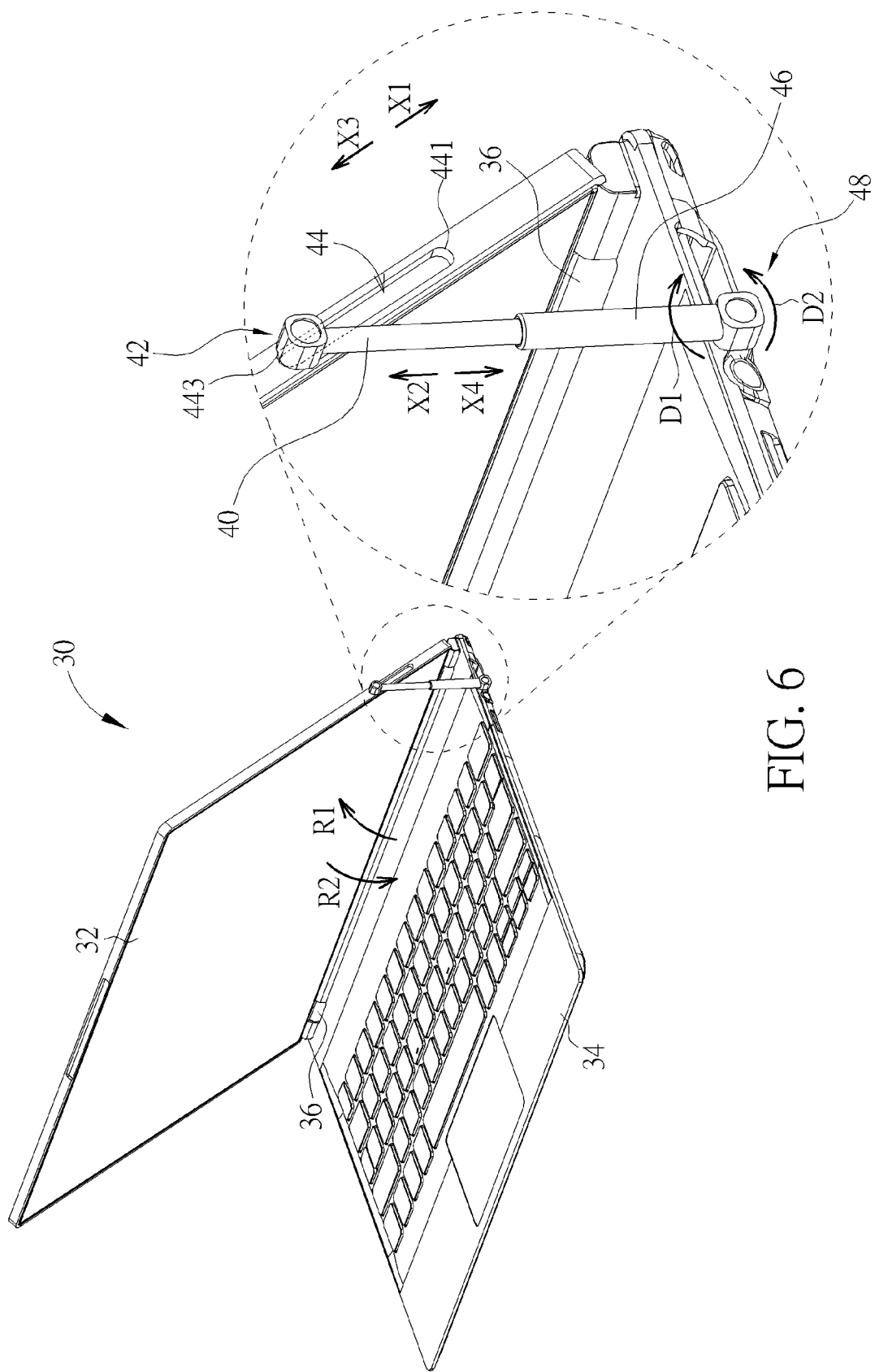
FIG. 6 is a diagram of the electronic device in a second abutting status according to the embodiment of the present invention.

Please refer to FIG. 1, FIG. 2 and FIG. 6. FIG. 6 is a diagram of the electronic device 30 in a second abutting status according to the embodiment of the present invention. As shown in FIG. 1, FIG. 2 and FIG. 6, when the electronic device 30 is desired to be contained, the first module 32 is rotated from the expanding position shown in FIG. 2 along a containing direction R2 opposite to the expanding direction R1 with respect to the second module 34. At the meanwhile, the pivoting end 48 of the second member 46 rotates in the pivoting hole 50 on the second module 34, and the sliding end 42 of the first member 40 slides in the sliding slot 44 along a third direction X3 far away from the hinge assembly 36. By the aforesaid design that the pivoting end 48 rotates in the pivoting hole 50 and the sliding end 42 slides in the sliding slot 44, the first member 40 and the second member 46 of the supporting mechanism 38 is capable of being rotated along a second rotating direction D2 when the first module 32 and the second module 34 are relatively rotated to be contained, as shown in FIG. 2 and FIG. 6. In this embodiment, the second rotating direction D2 is identical to the containing direction R2.

Furthermore, when the first module 32 is rotated along the containing direction R2 to a second abutting position shown in FIG. 6 with respect to the second module 34, the sliding end 42 of the first member 40 slides in the sliding slot 44 along the third direction X3 to abut against a second end 443 of the sliding slot 44. Afterwards, the first module 32 continues to be rotated from the second abutting position shown in FIG. 6 along the containing direction R2 with respect to the second module 34, the first member 40 and the second member 46 continues to rotate along the second rotating direction D2. Accordingly, the second end 443 of the sliding slot 44 on the first module 32 drives the sliding end 42 of the first member 40, so as to push the first member 40 to slide along a fourth direction X4 toward the second member 46 with respect to the second member 46. In other words, when the first module 32 continues to be rotated from the second abutting position shown in FIG. 6 along the containing direction R2 with respect to the second module 34, the first member 40 is pushed to retract to the second member 46 by the second end 443 of the sliding slot 44 on the first module 32. Furthermore, when the first module 32 continues to be rotated from the second abutting position shown in FIG. 6 to the containing position shown in FIG. 1 along the containing direction R2 with respect to the second module 34, the first module 32 is contained on the second module 34 for facilitating the user to contain or carry the electronic device 30.

In this embodiment, the electronic device 30 is a notebook computer, the first module 32 is a display module of the notebook computer, and the second module 34 is a host module of the notebook computer. The first member 40 is a shaft, the second member 46 is a sleeve, and the sleeve (i.e. the second member 46) slidably sheathes on the shaft (i.e. the first member 40). As mentioned above, the sliding end 42 of the shaft (i.e. the first member 40) is slidably installed on the display module (i.e. the first module 32), and the pivoting end 48 of the sleeve (i.e. the second member 46) is pivoted to the host module (i.e. the second module 34). Linkages among the shaft (i.e. the first member 40), the sleeve (i.e. the second member 46), the display module and the host module of the present invention are not limited to those mentioned in this embodiment. For example, the sliding end 42 of the shaft (i.e. the first member 40) can be slidably installed on the host module as well, and the pivoting end 48 of the sleeve (i.e. the second member 46) can be installed on the display module as well, that is, the first module 32 can be the host module of the notebook computer as well, and the second module 34 can be the display module of the notebook computer as well. In other words, structures that one of the first member 40 and second member 46 is a shaft and the other one of the first member 40 and the second member 46 is the sleeve and structures that the first module 32 is one of the display module and the host module and the second module 34 is the other one of the display module and the host module are within the scope of the present invention. As for which one of the aforesaid designs is adopted, it depends on practical demands.

Compared to the prior art, the first member and the second member of the supporting mechanism of the present invention are respectively connected to the first module and the second module, and the second member is connected to the first member in a relatively slidable manner. When the first module and the second module of the electronic device are relatively rotated to be expanded via the hinge assembly, the first member and the second member can rotate with the first module and the second module, such that the first member slides with respect to the second member. During the first member slides with respect to the second member, the friction force is generated between the first member and the second member for supporting and fixing the first module and the second module. As a result, when the first module of the electronic device is equipped with an extra module, such as a touch panel, it can not only be supported by the hinge assembly but also by the friction force generated by the first member and the second member, so as to support and fix the first module equipped with the extra module on the second module. In such a manner, it solves the wobble issues of the first module equipped with the extra module in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supporting mechanism for supporting a first module on a second module, the first module being pivoted to the second module via a hinge assembly, comprising:
   a first member comprising a sliding end slidably installed on the first module; and
   a second member connected to the first member in a relatively slidable manner, the first member being stretchable with respect to the second member and rotatable with the second member, the second member comprising a pivoting end pivoted to the second module, the sliding end of the first member sliding on the first module along a first direction toward the hinge assembly when the first module is rotated along an expanding direction with respect to the second module, so as to activate the second member to rotate with respect to the second module, such that the first member slides with respect to and at least partially stretches out of the second member along a second direction substantially parallel to an orientation of the second member, and wherein a friction force is generated between the first member and the second member when the first member slides along the second direction with respect to the second member.

2. The supporting mechanism of claim 1, wherein the sliding end of the first member is slidably installed in a sliding slot on the first module, the sliding end of the first member slides along the first direction to abut against a first end of the sliding slot when the first module is rotated along the expanding direction with respect to the second module such that the first end of the sliding slot pulls the first member to slide along the second direction with respect to the second member.

3. The supporting mechanism of claim 2, wherein the sliding end of the first member slides along a third direction far away from the hinge assembly to abut against a second end of the sliding slot when the first module is rotated along a containing direction opposite to the expanding direction with respect to the second module such that the second end pushes the first member to slide along a fourth direction toward the second member with respect to the second member.

4. The supporting mechanism of claim 3, wherein the first member further comprises a first stopping end, the second member further comprises a second stopping end, and the supporting mechanism further comprises:
   a first stopping structure arranged on the first stopping end of the first member; and
   a second stopping structure arranged on the second stopping end of the second member, the first member sliding along the second direction to a stopping position with respect to the second member when the first module is rotated along the expanding direction to an expanding position with respect to the second module such that the second stopping structure stops the first stopping structure.

5. The supporting mechanism of claim 1, further comprising:
   a slidable engaging mechanism connected to the sliding end of the first member, such that the sliding end of the first member is slidably disposed in a sliding slot on the first module.

6. The supporting mechanism of claim 5, wherein the slidable engaging mechanism comprises:
   a sliding base connected to the sliding end of the first member; and
   a sliding member slidably disposed within the sliding slot on the first module, the sliding member comprising a connecting portion and an engaging portion connected to the connecting portion, the connecting portion connecting the sliding base, and the engaging portion engaging with lateral walls of the sliding slot.

7. The supporting mechanism of claim 6, wherein the sliding base and the sliding end of the first member are integrally formed, the sliding member is a screw, the connecting portion of the sliding member is a thread portion of the screw, and the engaging portion of the sliding member is a nut of the screw.

8. The supporting mechanism of claim 1, further comprising:
   a pivotal engaging mechanism connected to the pivoting end of the second member such that the pivoting end of the second member is pivoted to a pivoting hole on the second module.

9. The supporting mechanism of claim 8, wherein the pivotal engaging mechanism comprises:
   a pivotal base connected to the pivoting end of the second member; and
   a pivotal member pivoted to the pivoting hole on the second module, the pivotal member comprising a bridging portion and a wedging portion connected to the bridging portion, the bridging portion bridging the pivotal base, and the wedging portion wedging lateral walls of the pivoting hole.

10. The supporting mechanism of claim 9, wherein the pivotal base and the pivoting end of the second member are integrally formed, the pivotal member is a screw, the bridging portion of the pivotal member is a thread portion of the screw, and the wedging portion of the pivotal member is a nut of the screw.

11. The supporting mechanism of claim 1, wherein one of the first member and the second member is a shaft, the other one of the first member and the second member is a sleeve, and the sleeve slidably sheathes the shaft.

12. An electronic device, comprising:
   a first module;
   a second module;
   a hinge assembly for pivoting the first module and the second module; and
   a supporting mechanism for supporting the first module on the second module, comprising:
      a first member comprising a sliding end slidably installed on the first module; and a second member connected to the first member in a relatively slidable manner, the first member being stretchable with respect to the second member and rotatable with the second member, the second member comprising a pivoting end pivoted to the second module, the sliding end of the first member sliding on the first module along a first direction toward the hinge assembly when the first module is rotated along an expanding direction with respect to the second module, so as to activate the second member to rotate with respect to the second module, such that the first member slides with respect to and at least partially stretches out of the second member along a second direction substantially parallel to an orientation of the second member, and wherein a friction force is generated between the first member and the second member when the first member slides along the second direction with respect to the second member.

13. The electronic device of claim 12, wherein a sliding slot is formed on the first module, the sliding end of the first member is slidably installed in the sliding slot, the sliding end of the first member slides along the first direction to abut against a first end of the sliding slot when the first module is rotated along the expanding direction with respect to the second module, such that the first end of the sliding slot pulls the first member to slide along the second direction with respect to the second member.

14. The electronic device of claim 13, wherein the sliding end of the first member slides along a third direction far away from the hinge assembly to abut against a second end of the sliding slot when the first module is rotated along a containing direction opposite to the expanding direction with respect to the second module, such that the second end pushes the first member to slide along a fourth direction toward the second member with respect to the second member.

15. The electronic device of claim 14, wherein the first member further comprises a first stopping end, the second member further comprises a second stopping end, and the supporting mechanism further comprises:
a first stopping structure arranged on the first stopping end of the first member; and
a second stopping structure arranged on the second stopping end of the second member, the first member sliding along the second direction to a stopping position with respect to the second member when the first module is rotated along the expanding direction to an expanding position with respect to the second module, such that the second stopping structure stops the first stopping structure.

16. The electronic device of claim 12, wherein a sliding slot is formed on the first module, and the supporting mechanism further comprises:
a slidable engaging mechanism connected to the sliding end of the first member, such that the sliding end of the first member is slidably disposed in the sliding slot.

17. The electronic device of claim 16, wherein the slidable engaging mechanism comprises:
a sliding base connected to the sliding end of the first member; and
a sliding member slidably disposed within the sliding slot on the first module, the sliding member comprising a connecting portion and an engaging portion connected to the connecting portion, the connecting portion being connected to the sliding base, and the engaging portion engaging with lateral walls of the sliding slot.

18. The electronic device of claim 12, wherein a pivoting hole is formed on the second module, and the supporting mechanism further comprises:
a pivotal engaging mechanism connected to the pivoting end of the second member, such that the pivoting end of the second member is pivoted to the pivoting hole.

19. The electronic device of claim 18, wherein the pivotal engaging mechanism comprises:
a pivotal base connected to the pivoting end of the second member; and
a pivotal member pivoted to the pivoting hole on the second module, the pivotal member comprising a bridging portion and a wedging portion connected to the bridging portion, the bridging portion bridging the pivotal base, and the wedging portion wedging lateral walls of the pivoting hole.

20. The electronic device of claim 12, wherein one of the first member and the second member is a shaft, the other one of the first member and the second member is a sleeve, the sleeve slidably sheathes the shaft, the first module is one of a display module and a host module, and the second module is the other one of the display module and the host module.

* * * * *